US009138777B2

(12) United States Patent
Alessandro et al.

(10) Patent No.: US 9,138,777 B2
(45) Date of Patent: Sep. 22, 2015

(54) LOW GLOSS WOOD FOR INTERIOR TRIM

(71) Applicant: Honda Motor Co., Ltd., Tokyo (JP)

(72) Inventors: Jessica Alessandro, Dublin, OH (US); Corey McEnhill, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/662,488

(22) Filed: Oct. 28, 2012

(65) Prior Publication Data

US 2013/0052358 A1 Feb. 28, 2013

Related U.S. Application Data

(62) Division of application No. 12/504,742, filed on Jul. 17, 2009, now Pat. No. 8,298,675.

(51) Int. Cl.
*B05D 7/08* (2006.01)
*B05D 7/00* (2006.01)
*B60R 13/02* (2006.01)
*C09D 7/12* (2006.01)
*C09D 15/00* (2006.01)
*C08K 5/17* (2006.01)

(52) U.S. Cl.
CPC .. *B05D 7/08* (2013.01); *B05D 7/53* (2013.01); *B60R 13/02* (2013.01); *C09D 7/1241* (2013.01); *C09D 15/00* (2013.01); *C08K 5/17* (2013.01); *Y10T 428/265* (2015.01); *Y10T 428/31551* (2015.04)

(58) Field of Classification Search
None
See application file for complete search history.

(56) References Cited

U.S. PATENT DOCUMENTS

| 4,179,548 | A | | 12/1979 | Schroeter et al. |
| 4,242,253 | A | | 12/1980 | Yallourakis |
| 4,393,120 | A | * | 7/1983 | Watai et al. ................ 428/457 |
| 4,539,047 | A | | 9/1985 | Crockatt et al. |
| 4,831,109 | A | | 5/1989 | Mitra et al. |
| 4,855,184 | A | | 8/1989 | Klun et al. |

(Continued)

FOREIGN PATENT DOCUMENTS

| DE | 3813025 A1 | 11/1989 |
| EP | 0338264 B1 | 12/1993 |

(Continued)

OTHER PUBLICATIONS

Lange REFO 3D Gloss Meter Specifications—Obtained at https://www.hach-lange.co.uk/view/product/EU-LMV138/REFO%203D?productCode=EU-LMV138 on Mar. 18, 2013.*

(Continued)

*Primary Examiner* — Timothy Meeks
*Assistant Examiner* — Michael P Rodriguez
(74) *Attorney, Agent, or Firm* — Capitol City TechLaw, PLLC; Samuel P. Burkholder; Mark E. Duell

(57) ABSTRACT

The present disclosure is directed to a light-colored wood component for the interior of an automotive vehicle that includes a UV additive-containing aqueous treating mixture coated onto the wood substrate at a loading ranging between about 84 to about 104 $g/m^2$, and having a low gloss polyurethane-containing topcoat essentially free of UV additives applied to the top surface of the wood substrate. The wood component can have a 60 degree surface gloss rating no greater than about 25 gloss units measured according to ASTM D523-08 test conditions. Methods of producing the vehicle interior component are also disclosed.

20 Claims, 2 Drawing Sheets

(56) References Cited

U.S. PATENT DOCUMENTS

| | | | |
|---|---|---|---|
| 5,019,199 A | 5/1991 | Menke et al. | |
| 5,135,963 A | 8/1992 | Haeberle | |
| 5,338,592 A | 8/1994 | Ohsumi et al. | |
| 5,459,222 A | 10/1995 | Rodgers et al. | |
| 5,480,680 A | 1/1996 | Vieyra | |
| 5,702,558 A | 12/1997 | Schadel | |
| 5,707,690 A | 1/1998 | Valet et al. | |
| 5,744,210 A | 4/1998 | Hofmann et al. | |
| 6,017,593 A | 1/2000 | Daly et al. | |
| 6,025,064 A | 2/2000 | Kawata et al. | |
| 6,187,387 B1 * | 2/2001 | Bolle et al. | 427/408 |
| 6,242,055 B1 | 6/2001 | Neumann et al. | |
| 6,348,242 B1 | 2/2002 | Daly et al. | |
| 6,444,319 B1 | 9/2002 | Berg et al. | |
| 6,444,721 B2 | 9/2002 | Schwalm et al. | |
| 6,649,245 B2 | 11/2003 | Lenderink | |
| 6,800,325 B2 | 10/2004 | Ehrath et al. | |
| 6,852,765 B2 * | 2/2005 | Decker et al. | 522/2 |
| 6,867,250 B1 | 3/2005 | Gupta et al. | |
| 6,936,351 B2 | 8/2005 | Ohyanagi et al. | |
| 7,014,797 B2 | 3/2006 | Danielson et al. | |
| 7,214,340 B2 | 5/2007 | Berg et al. | |
| 7,223,478 B2 * | 5/2007 | Treiber et al. | 428/423.4 |
| 7,384,253 B2 | 6/2008 | Berg et al. | |
| 2003/0176527 A1 | 9/2003 | Votteler et al. | |
| 2004/0002559 A1 | 1/2004 | Troutman et al. | |
| 2005/0025910 A1 | 2/2005 | Ehrath | |
| 2005/0136277 A1 | 6/2005 | Daly et al. | |
| 2005/0260405 A1 | 11/2005 | Dietsche et al. | |
| 2006/0075923 A1 | 4/2006 | Richardson | |

FOREIGN PATENT DOCUMENTS

| | | |
|---|---|---|
| EP | 0978369 A1 | 2/2000 |
| EP | 0978420 A1 | 2/2000 |
| EP | 1338475 A2 | 8/2003 |
| EP | 1360089 B1 | 8/2004 |
| WO | 99/55511 A1 | 11/1999 |
| WO | 01/45860 A2 | 6/2001 |

OTHER PUBLICATIONS

Braig et al.—UV Protection of Substrates Light Sensitive towards 400 nm and Above; Ciba Specialty Chemicals, May 2007.*

Tapan Debroy, "Stabilization of Coatings," 2nd Annual Wood Coatings and Substrates Conference, Sep. 29, 2006.

Ciba Specialty Chemicals, "Ciba LIGNOSTAB 1198 Wood Photostabilizing Additive: A New Concept for the Photoprotection of Wood in Indoor Applications," Mar. 2003, Basel, Switzerland.

"Ingrained in Wood," Industry Today—The World of Manufacturing, 2005, vol. 8, No. 2, Positive Publications, Springfield, New Jersey.

Braig, Adalbert; and Schaller, Christian, "UV protection of substrates light sensitive towards 400nm and above," Ciba Speciality Chemicals, May 2007, Basel, Switzerland.

Ciba LIGNOSTAB 1198 Wood Photostabilizing Additive, Oct. 2002, 4 pages, Switzerland.

* cited by examiner

LOW GLOSS WOOD FOR INTERIOR TRIM

CROSS-REFERENCE TO RELATED APPLICATIONS

The present application is a divisional application and claims benefit of U.S. patent application Ser. No. 12/504,742 filed Jul. 17, 2009, now U.S. Pat. No. 8,298,675 B2 issued Oct. 30, 2012, which is incorporated by reference herein in its entirety for all purposes.

BACKGROUND

1. Field of the Invention

The present disclosure relates to methods of treating light-colored wood substrates to produce a wood substrate with a low gloss, open pore appearance that provides enhanced protection from ultraviolet ("UV") radiation and a "real" wood look. The present disclosure also relates to the wood components produced by the methods disclosed herein.

2. Description of the Related Art

Real wood trim pieces with very glossy finishes in some automotive vehicles are difficult to distinguish from plastic woodgrain films. A simple polyurethane (herein "PU") coating can have the desired appearance but typically cannot meet rigorous performance targets for, for example, long term resistance to fading upon extended exposure to sunlight.

However, real wood remains a popular choice for the interior of upscale and luxury automobiles. In order to meet rigorous performance targets multiple coats of high gloss finishes are routinely used with real wood trim pieces in automotive vehicles in an attempt to meet the light resistance standard and other performance criteria, but the resulting high gloss finish makes the real wood appear to the ordinary consumer to be less desirable woodgrain plastic films.

A method of achieving the necessary light resistance properties while maintaining a "real" wood appearance, that is, not a high gloss finish, is of interest.

SUMMARY OF THE PRESENT DISCLOSURE

The present disclosure is directed to a method of treating a light-colored wood substrate by providing a wood substrate having a top surface and contacting a first aqueous treating mixture containing UV additives with the top surface of the wood substrate. The wood substrate can then be optionally coated with a stain to produce a stained wood substrate. The wood substrate can then be coated with a topcoat composition comprising a low gloss polyurethane, which is essentially free of UV additives. In this presently disclosed method, the first aqueous treating mixture can have UV additives present in a concentration of about 2 wt. %, and can be applied to the wood substrate at a solution loading ranging from between about 84 to about 104 g/m², and the topcoat composition comprises a composition which provides a 60 degree surface gloss rating of no greater than about 25 gloss units measured according to ASTM D523-08 test conditions.

A light-colored wood component for the interior of an automotive vehicle is also taught by the present disclosure. The component can be composed of a light-colored wood substrate having a top surface, with an UV additive-containing layer located on the top surface, and a polyurethane-containing layer located on top of the UV additive-containing layer. The polyurethane-containing layer can be a polyurethane composition which provides a 60 degree surface gloss rating of no greater than about 25 gloss units measured according to ASTM D523-08 test conditions.

The present method can also include the additional steps of adhering the wood substrate to a support component made of metal, plastic or a composite material to form a part. The part can be machined to the desired dimensions, and then located within an automotive interior.

BRIEF DESCRIPTION OF THE DRAWINGS

The accompanying drawings, which are included to provide a further understanding of the present teachings and are incorporated in and constitute a part of this specification, illustrate various exemplars of the present teachings and together with the detailed description serve to explain the principles of the present teachings.

In the drawings.

DETAILED DESCRIPTION

Wood is composed of three primary components, lignin, cellulose, and hemicellulose. Cellulose and hemicellulose are, respectively, short branched chains of glucose and long straight chains of glucose. Lignin is described as a three dimensional phenolic polymer that binds the cellulose fibers together, that is, essentially glue for the wood structure. About 38 to 50 wt. % of wood is cellulose; about 23 to 32 wt. % is hemicellulose, and about 15 to 25 wt. % of wood is composed of lignin.

Of the three components, lignin is the most sensitive to degradation due to photo-oxidation. UVA radiation can degrade the lignin and lead to a noticeable color change, typically greening, of the wood. Exposure to visible light can also lead to degradation of lignin which can result in either a yellowing or darkening of the wood. Visible light exposure can also result in bleaching of the wood by degradation of the natural colorants present in the wood.

Automotive interior components typically can be exposed to levels of heat, UV radiation and IR radiation which can detrimentally affect the appearance of the interior component, particularly wood-based components, over time. Furthermore, low gloss finishes for components such as dashboard skin components are desired in order to avoid causing distracting and annoying glare.

Figure 1A:
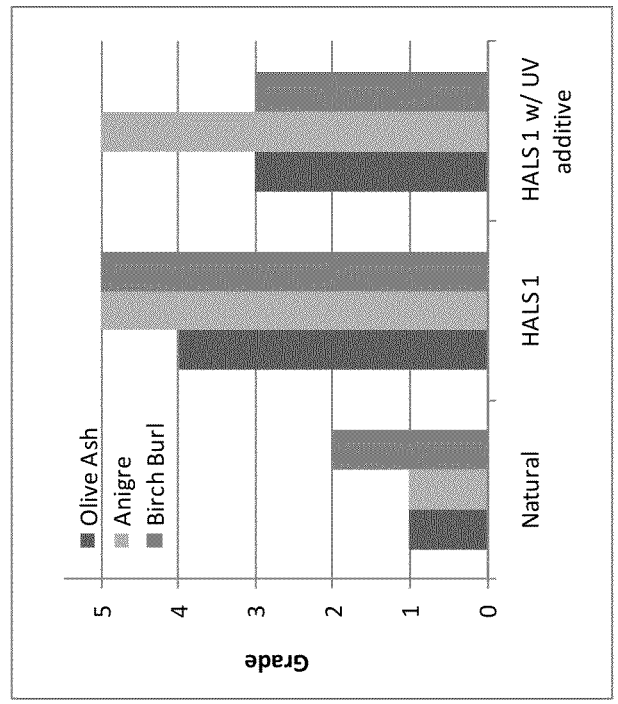
FIGS. 1A and 1B are charts of grading results for discoloration, FIG. 1A, and for fading, FIG. 1B, respectively, showing the effects of UV additives for wood substrates prepared according to the present teachings.
Figure 1B:
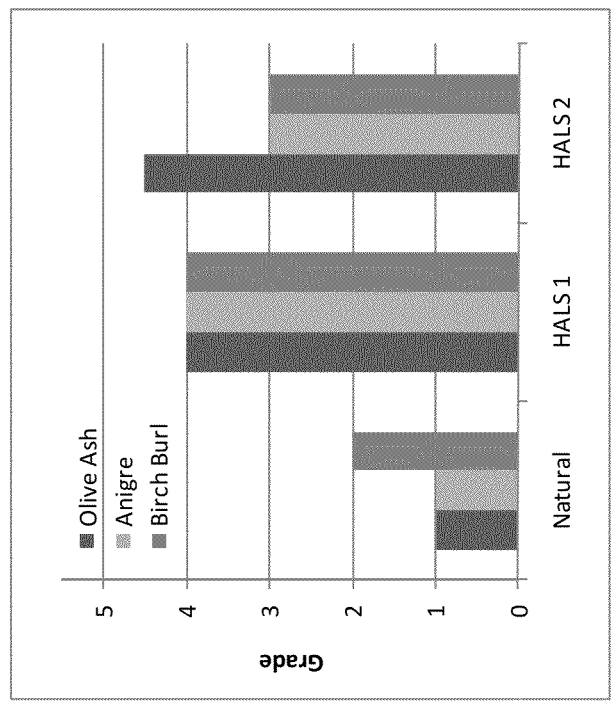

As shown in FIGS. 1A and 1B, there is a fine balance between the process of bleaching of the wood by exposure to visible light, and the darkening of the wood by exposure to UV and visible light. FIGS. 1A and B show the relative amounts of discoloration and fading that occurred when three different light colored woods, here, olive ash, anigre, and birch burl, were treated as follows:

1) left natural,
2) treated with UV additives directly on the wood, and then coated with a low gloss PU topcoat without UV additives, and
3) treated with UV additives directly on the wood, and then coated with a low gloss PU topcoat containing UV additives.

The samples were then exposed to 100 MJ (megajoule) of light from an xenon arc lamp at a temperature of 89±3° C. at 50±5% relative humidity to obtain an irradiance of about 48 to about 100 W/m². The exposed samples were then graded for discoloration and fading on a 0-5 scale with 5 being the highest.

As seen in FIG. 1B, for wood treated with UV additives both coated directly on the wood and also present in the PU topcoat, the combination does not result in improved performance but rather a lower graded product results. Without being limited to this analysis, this performance is believed to be due to having the competing darkening and bleaching degradation reactions unbalanced by the presence of an overabundance of UV additives.

Further set forth and disclosed herein is a method of treating a wood substrate by providing a wood substrate having a top surface and contacting a first aqueous treating mixture containing UV additives with the top surface of the wood substrate. The wood substrate is then coated with a topcoat composition comprising a low gloss polyurethane, which is essentially free of UV additives. In this presently disclosed method, the first aqueous treating mixture has UV additives present in a concentration of about 2 wt. % and is coated onto the wood substrate at a loading ranging between about 84 to about 104 g/m², and the topcoat composition comprises a composition which provides a 60 degree surface gloss rating of no greater than about 25 gloss units measured according to ASTM D523-08 test conditions.

The disclosed method can result in an attenuation of the transmission of UVA radiation to the top surface of the wood by at least about 80%, or in other cases, by at least about 90%, as compared to untreated wood substrates.

The first aqueous treating mixture used in the method can have UV additives present at about 2 wt. %, and can be coated onto the wood at a loading of about 94 g/m², and those UV additives can be, for instance, a free radical nitroxide-containing component. One example of a free radical nitroxide-containing component can be a tetra-methyl piperidine-based composition.

An "UV additive" can be generally defined herein as an additive or composition component that protects the wood substrate from degradation due to exposure to UV radiation, and can include both UV absorbers which protect against degradation from UV radiation by absorbing the UV radiation, and also hindered amine light stabilizers ("HALS") which provide protection by neutralizing the free radicals that are produced by UV radiation. Suitable HALS additives for the presently disclosed subject matter can include monomeric hindered amine light stabilizers, oligomeric hindered amine light stabilizers, derivatives thereof, and mixtures thereof. Some particular UV additives of interest are the commercially available Lignostab® 1198 from Ciba Chemical, and L8900720 from Votteler.

With respect to the optional staining of the wood substrate, the stain can be applied to the wood at a concentration of between about 70 and about 120 g/m². Depending on the color of the initial wood substrate and the desired final color of the finished wood component the amount, type, and concentration of the stain component can be varied. One of ordinary skill in the art will know how to vary these factors to achieve the desired final effect. In some embodiments of the present method, the stain can be a water-based stain.

According to the presently disclosed method, the topcoat composition can result in a finished topcoat having a thickness ranging between about 16 and about 23 μm. In any case, the topcoat should be of sufficient thickness to provide the wood with protection against exposure to the elements such as, moisture and scratching.

The topcoat applied to the wood component of the present disclosure can have incorporated therein, further additives to provide, for example, enhanced resistance to moisture, scratches and infrared radiation.

A low gloss polyurethane topcoat composition suitable for the various embodiments of the present method can include a composition which provides a 60 degree surface gloss rating with a maximum rating ranging from no greater than about 25 gloss units, about 15 gloss units, about 10 gloss units, or about 5 gloss units measured according to ASTM D523-08 test conditions. In some cases of the presently disclosed method, the low gloss polyurethane topcoat can provide a gloss rating of up to about 30 gloss units. Examples of suitable low gloss polyurethane compositions will be known to one of ordinary skill in the pertinent art.

In some embodiments of the present method, polyester or acrylic-containing compositions can be utilized as the topcoat composition. One example of a suitable topcoat is Puridur-Lack Farblos Satin from Voetteler.

The wood substrate produced by any of the various embodiments of the presently disclosed methods can be incorporated into an automotive vehicle interior.

The present method can further include incorporating the wood substrate into an automotive vehicle interior. The incorporation process can include the steps of adhering the wood substrate to a support component comprising metal, plastic or a composite material to form a part, machining that part to the desired dimensions, and finally locating the part within an automotive interior.

The optional stain utilized in the presently disclosed method can be a water-based stain. One of ordinary skill in the pertinent art will know and recognize suitable water-based stains. In the presently disclosed method of preparing a wood component, one or all of the coating mixture containing UV additives, the optional stain-containing coating, and the low gloss polyurethane-containing topcoat composition can be applied also to any side surfaces or the bottom surface of the wood substrate. One suitable water-based satin can be L6804569 available from Voetteler.

The presently taught treated wood substrate can be, in nearly all cases, located behind and protected by a pane of UVB ray-absorbing or deflecting automotive glass. With the presence of the UVB attenuating glass, the treatment of the wood for the interior compartment can be tailored to protecting the wood from the degradation processes due to long term exposure to UVA and visible radiation.

Figure 2B:
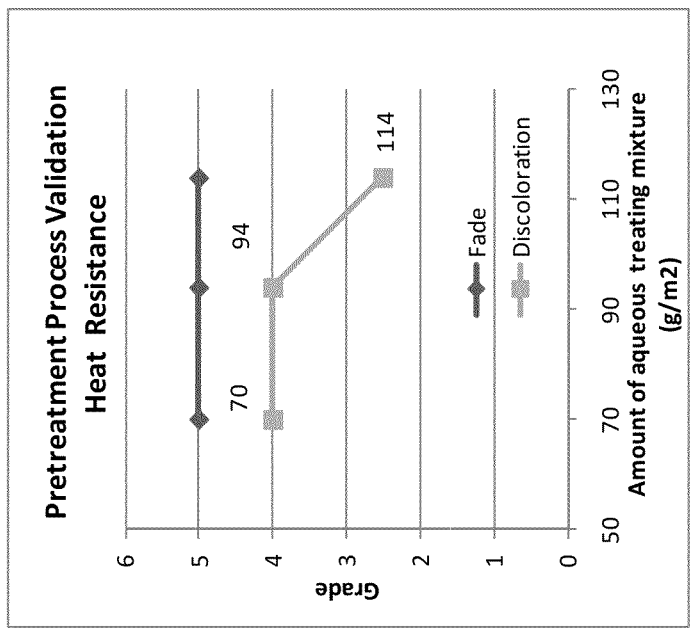
FIGS. 2A and 2B are charts of grading results showing the effects of the presence of UV additives.
Figure 2A:
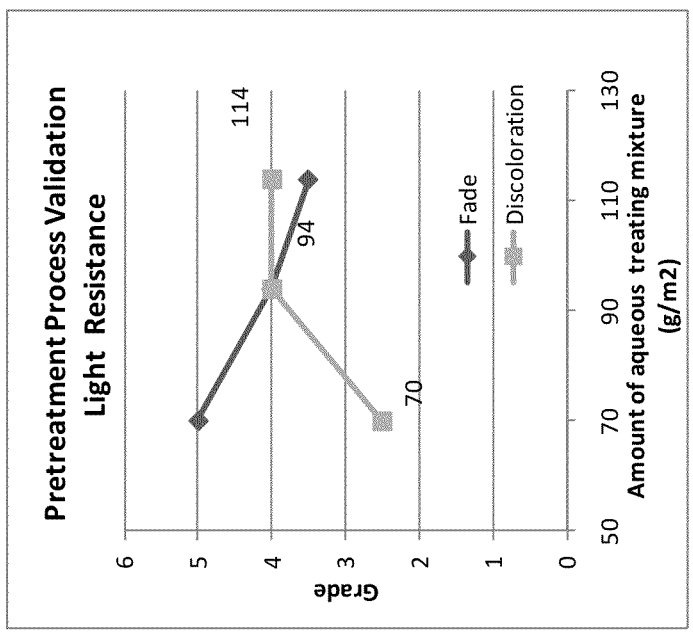

As illustrated in FIGS. 2A and 2B, aging due to light exposure and aging due to heat exposure appear to manifest themselves in different degradation processes which can be competing factors. These two graphs depict the effects of increasing the amount of UV additive present in the first aqueous treating mixture on the performance of the treated wood substrate upon aging under light or heat. Under light exposure only, increasing the UV additive loading provides increased resistance to discoloration but decreases the resistance to fading while under heat exposure only, increasing the UV additive loading had deleterious effects on resistance to discoloration and no effect on fading. From these results, the loading of the solution containing UV additives in the first aqueous treating mixture ranges from about 70 to about 120 g/m², with an optimum loading of about 94 g/m². The results show that simply adding more UV additive does not improve performance, and actually appears to decrease performance.

The present disclosure also includes a light-colored wood component for the interior of an automotive vehicle. The component can be made from a light-colored wood substrate with an UV additive-containing layer located on the top surface, and a subsequent a polyurethane-containing layer located on top of the UV additive-containing layer. The polyurethane-containing layer can be a polyurethane composition which provides a 60 degree surface gloss rating of no greater than about 25 gloss units measured according to ASTM D523-08 test conditions.

Typically, the light-colored wood substrate would not be stained but in some embodiments the treated substrate can include a stain layer located between the polyurethane-containing layer and the UV additive-containing layer.

The component according to the present disclosure can have a polyurethane-containing layer with a thickness ranging between about 16 and about 23 µm. The thickness of the PU-containing layer should be of sufficient thickness to provide protection against moisture and other deleterious effects.

The low gloss polyurethane composition coated onto the wood component should provides a 60 degree surface gloss rating no greater than about 15 gloss units measured according to ASTM D523-08 test conditions.

The surface gloss of the presently disclosed wood components can be measured by various techniques such as the technique utilized according to ASTM Standard D523-08, 2008, "Standard Test Method For Specular Gloss," ASTM International, West Conshohocken, Pa., www.astm.org. A Dorigon gloss meter manufactured by HunterLab or a Byk-Malinckrodt gloss meter are some examples of suitable instruments used to provide instrument precision gloss measurements.

Vehicle interior design criteria, type of wood, type of stain, costs, and other numerous production requirements can vary, and one of ordinary skill in the art will know suitable treating and coating parameters to achieve the desired levels of longevity, protection, and other characteristics of the wood substrate.

As used herein, for ease of discussion only, the light spectrum can be divided into several regions, for instance, "UVB" for the portion of the spectrum ranging from 280 to 315 nm, "UVA" for the portion of the spectrum ranging from 315 to 400 nm, and "VIS" for the portion of the spectrum ranging from 400 to 500 nm.

As used herein, "automotive" or "automobile" refers to, for example and without limitation, cars, trucks, buses, motorcycles, all-terrain vehicles, personal watercraft, boats, and other self-propelled vehicles.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXAMPLES

Experimental

Samples of veneers were treated according to the presently disclosed method, exposed to aging conditions as set forth below, and then graded on a 0 to 5 point scale for fading and discoloration.

Light aging of samples was accomplished by exposing the samples to 100 MJ of light from an xenon arc lamp at a temperature of 89+3° C. at 50+5% relative humidity to obtain an irradiance of about 48 to about 100 W/m$^2$. Heat exposure was accomplished by exposing the samples to 100° C. heat for 500 hours.

Example 1

Veneers of olive ash, anigre and birch burl wood were, alternately, a) left natural, b) treated with two different aqueous mixtures with UV additives, HALS 1 and HALS 2, directly on the wood, and then coated with a low gloss PU topcoat without UV additives, and c) treated with the HALS 1 UV additive directly on the wood, and then coated with a low gloss PU topcoat containing additional UV additives.

All the veneers were then exposed to light as described above, and discoloration of the wood samples without additional UV additives in the topcoat was rated accordingly. The samples treated with HALS 1 additives were graded higher, on average. The discoloration results are presented in FIG. 1A.

The fading of the samples containing the HALS 1 additive with and without additional UV additives in the topcoat was then rated. The fading resistance results are presented in FIG. 1B.

As seen in FIG. 1B, and discussed above, wood treated directly with the HALS 1 UV additive, and with a topcoat being essentially free of UV additive result in improved performance. The presence of additional UV additive in the topcoat did not yield a better product.

Example 2

Birch burl wood veneers were treated with an aqueous composition containing the UV additive, HALS 1, directly on the wood, and then coated with a low gloss PU topcoat without any additional UV additives. The UV additive-containing composition was coated directly onto the veneer at three different loadings; 70, 94, and 114 g/m$^2$, respectively. Each of the coating compositions had the HALS 1 additive present at a concentration of 2 wt. %.

Samples of the birch burl veneers were then exposed to light and heat, as described above, and fading and discoloration of the wood samples were graded accordingly. The grading results after light or heat exposure are presented in FIGS. 2A and 2B, respectively.

As illustrated in FIG. 2A, increasing the UV additive loading provides increased resistance for light exposure to discoloration but decreases the resistance to fading. For heat exposure only, as shown in FIG. 2B, over the studied range, there was no effect on fade resistance, while increasing the UV additive loading decreased the resistance of the treated wood veneer to discoloration. From these results, the loading of the solution containing UV additives has an optimum loading of about 94 g/m$^2$.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular

What we claim is:

1. A method of treating a wood substrate comprising:
providing a wood substrate having a top surface;
contacting a first aqueous treating mixture containing UV additives with the top surface of the wood substrate; and
coating the wood substrate with a topcoat composition essentially free of UV additives and comprising a low gloss polyurethane,
wherein the first aqueous treating mixture is coated onto the wood substrate at a loading ranging between about 84 to about 104 g/m$^2$, has UV additives present in a concentration of about 2 wt. %, and the topcoat composition comprises a composition which provides a 60 degree surface gloss rating of no greater than about 25 gloss units measured according to ASTM D523-08 test conditions.

2. The method according to claim 1, wherein transmission of UVA radiation to the top surface of the wood is attenuated by at least about 80%.

3. The method according to claim 1, wherein transmission of UVA radiation to the top surface of the wood is attenuated by at least about 90%.

4. The method according to claim 1, wherein the first aqueous treating mixture is coated onto the wood substrate at a loading of about 94 g/m$^2$.

5. The method according to claim 1, wherein the UV additives of the first aqueous treating mixture comprise a free radical nitroxide-containing component.

6. The method according to claim 5, wherein the free radical nitroxide-containing component comprises a tetramethyl piperidine-based composition.

7. The method according to claim 1, wherein the UV additives of the first aqueous treating mixture comprise at least one member selected from the group consisting of hindered amine light stabilizers, monomeric hindered amine light stabilizers, oligomeric hindered amine light stabilizers, derivatives thereof, and mixtures thereof.

8. The method according to claim 1, wherein a stain is applied to the wood surface after the first aqueous treating mixture is contacted with the top surface of the wood substrate.

9. The method according to claim 8, wherein the stain comprises a water-based stain.

10. The method according to claim 1, wherein the topcoat composition results in a topcoat having a thickness ranging between about 16 and about 23 μm.

11. The method according to claim 10, wherein the topcoat is of sufficient thickness to provide the wood with protection against moisture.

12. The method according to claim 1, wherein the low gloss polyurethane comprises a composition which provides a 60 degree surface gloss rating no greater than about 15 gloss units measured according to ASTM D523-08 test conditions.

13. The method according to claim 1, wherein the low gloss polyurethane comprises a composition which provides a 60 degree surface gloss rating no greater than about 10 gloss units measured according to ASTM D523-08 test conditions.

14. The method according to claim 1, further comprising incorporating the wood substrate into an automotive vehicle interior.

15. A method of treating a wood substrate comprising:
treating a wood substrate directly with a treating mixture consisting of an aqueous solution of one or more UV additives to load the wood substrate with at least one UV additive in a range of between about 1.7 to about 2.1 g/m$^2$; and
coating the treated wood substrate with a topcoat composition consisting of a low gloss polyurethane.

16. The method according to claim 15, wherein the low gloss polyurethane provides a 60 degree surface gloss rating of no greater than about 25 gloss units measured according to ASTM D523-08 test conditions.

17. The method according to claim 15, wherein the topcoat composition results in a topcoat having a thickness ranging between about 16 and about 23 μm.

18. The method according to claim 15, wherein the at least one UV additive is loaded on the wood substrate at about 1.9 g/m$^2$.

19. A method of attenuating the effects of exposure to light and heat on wood substrates comprising
providing a wood substrate having a top surface;
treating the top surface of the wood substrate directly with a treating mixture consisting of an aqueous solution and at least one UV additive at a loading ranging between about 84 to about 104 g/m$^2$;
coating the treated surface with a low gloss polyurethane topcoat composition essentially free of UV additives, the low gloss polyurethane topcoat composition having a 60 degree surface gloss rating of no greater than about 25 gloss units measured according to ASTM D523-08 test conditions;
exposing the coated wood substrate to light and heat conditions; and
decreasing by at least 80% the amount of UVA radiation transmitted to the top surface of the wood substrate as compared to an uncoated wood substrate.

20. The method according to claim 19, wherein wood comprises at least one wood selected from the group consisting of olive ash, anigre, and birch burl.

* * * * *